(12) United States Patent
Guidetti

(10) Patent No.: US 11,297,368 B1
(45) Date of Patent: Apr. 5, 2022

(54) METHODS, SYSTEMS, AND APPARATUSES AND LIVE AUDIO CAPTURE

(71) Applicant: Louis-Pierre Guidetti, Mill Valley, CA (US)

(72) Inventor: Louis-Pierre Guidetti, Mill Valley, CA (US)

( * ) Notice: Subject to any disclaimer, the term of this patent is extended or adjusted under 35 U.S.C. 154(b) by 0 days.

(21) Appl. No.: 17/175,392

(22) Filed: Feb. 12, 2021

(51) Int. Cl.
| | |
|---|---|
| *H04N 21/439* | (2011.01) |
| *H04N 21/432* | (2011.01) |
| *H04L 65/1089* | (2022.01) |
| *H04N 21/422* | (2011.01) |
| *H04N 21/278* | (2011.01) |
| *H04L 67/06* | (2022.01) |
| *H04N 21/433* | (2011.01) |
| *H04N 21/2187* | (2011.01) |
| *H04N 21/4223* | (2011.01) |

(Continued)

(52) U.S. Cl.
CPC ........... *H04N 21/278* (2013.01); *H04L 67/06* (2013.01); *H04N 5/765* (2013.01); *H04N 21/2187* (2013.01); *H04N 21/4223* (2013.01); *H04N 21/4334* (2013.01); *H04N 21/25875* (2013.01)

(58) Field of Classification Search
CPC ............ H04N 21/278; H04N 21/4334; H04N 21/2187; H04N 21/8456; H04N 21/434; H04N 19/147; H04N 19/15; H04N 19/172; H04N 21/23406; H04N 21/2343; H04N 21/236; H04N 21/2662; H04N 7/52; H04N 21/41407; H04N 21/2743; H04N 21/4788; H04N 21/8549; H04N 21/4394; H04N 21/472; H04N 21/21805; H04N 21/25841; H04N 21/25875; H04N 21/4223; H04N 21/4431; H04N 21/8547; H04N 5/765; H04N 9/8211; H04N 21/4524; H04N 21/8106; H04N 5/91; H04N 5/9305; H04N 21/231; H04N 21/233; H04N 21/4307; H04N 21/433; H04N 21/47205; H04N 21/4828; H04N 21/632; H04N 21/8113; H04N 21/84; H04N 5/76; H04N 5/772; H04N 7/181; H04N 9/8244; H04N 21/41415; H04N 21/42202; H04N 21/42203; H04N 21/432; H04N 21/4392; H04N 21/4398; H04N 21/4532; H04N 21/4622; H04N 21/4884; H04N 21/6437; H04N 21/8455; H04N 5/85; H04N 9/8042; H04N 9/8063; H04N 9/8227; H04L 67/06
See application file for complete search history.

(56) References Cited

U.S. PATENT DOCUMENTS

| | | |
|---|---|---|
| 7,062,147 B2 | 6/2006 | Cooper et al. |
| 8,145,782 B2 | 3/2012 | McGowan et al. |

(Continued)

FOREIGN PATENT DOCUMENTS

WO   2020086771   4/2020

*Primary Examiner* — Alazar Tilahun
(74) *Attorney, Agent, or Firm* — Stoel Rives LLP

(57) ABSTRACT

A live audio bite system may capture audio bites of a live event based on input from a spectator's device. The system may include an audience device, a server, and a recording device. The audience device may provide input of when an audio capture is desired. The recording device may record audio directly from an audio source on a circular buffer. The server may facilitate communication between audience devices and recording devices and store requested audio clips.

20 Claims, 5 Drawing Sheets

(51) Int. Cl.
*H04N 5/765* (2006.01)
*H04N 21/258* (2011.01)

(56) References Cited

U.S. PATENT DOCUMENTS

| | | |
|---|---|---|
| 8,230,343 B2 | 7/2012 | Logan et al. |
| 8,543,622 B2 | 9/2013 | Patrick |
| 8,874,778 B2 | 10/2014 | Xu et al. |
| 9,838,455 B2 | 12/2017 | Einarsson |
| 10,728,354 B2 | 7/2020 | Kolowich et al. |
| 2006/0190968 A1* | 8/2006 | Jung ................ H04N 5/23235 725/74 |
| 2008/0022007 A1 | 1/2008 | Hostyn et al. |
| 2019/0158906 A1 | 5/2019 | Gonder et al. |

* cited by examiner

METHODS, SYSTEMS, AND APPARATUSES AND LIVE AUDIO CAPTURE

TECHNICAL FIELD

The present disclosure relates generally to capturing audio clips of a live event such as a concert.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
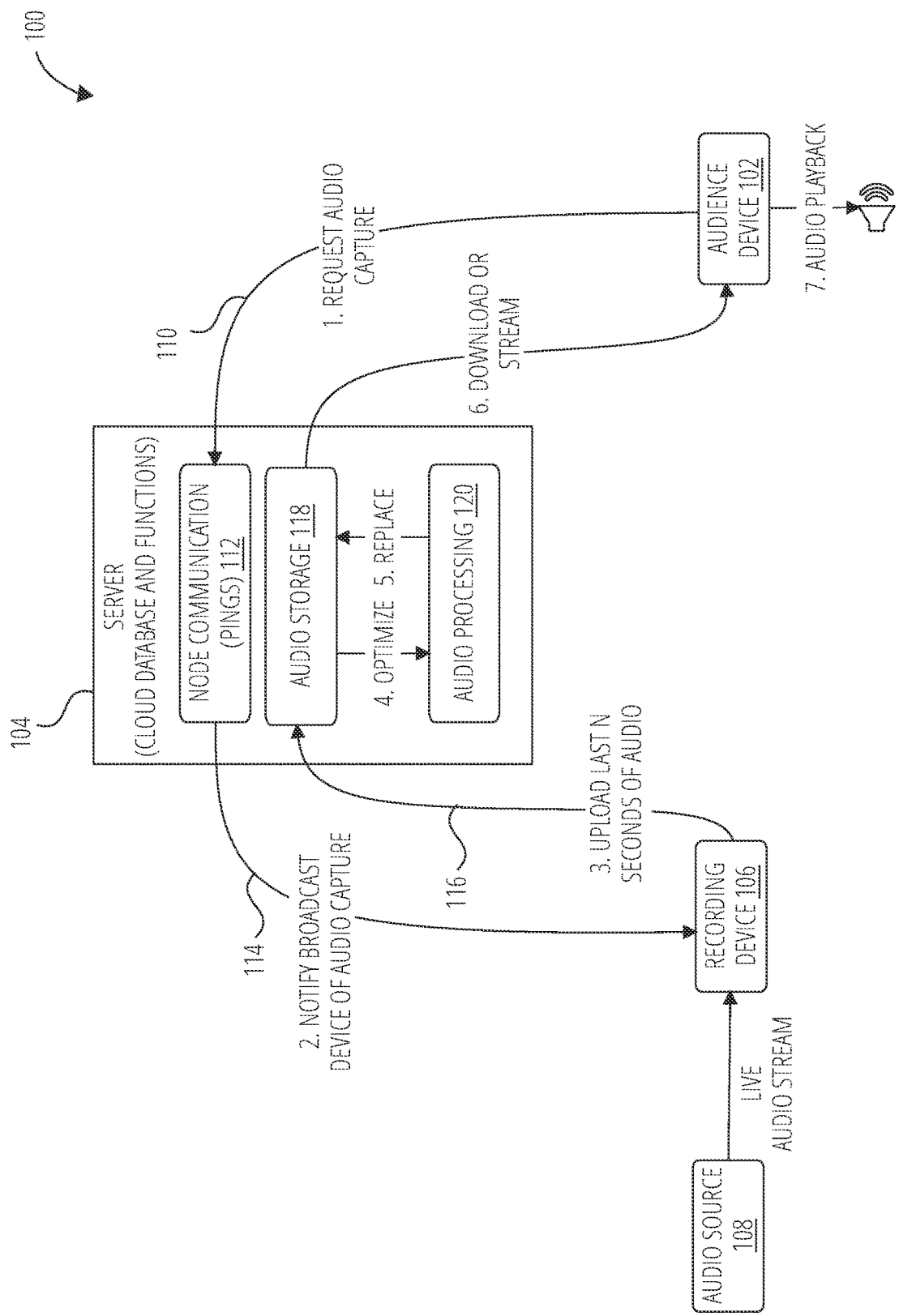
FIG. 1 illustrates a signal flow block diagram of a live audio bite system 100 in accordance with one embodiment.

Attending a live event, such as a concert, can be an exceptional way to connect spectators and performers. There are certain ways to enhance this connection. For example, the spectator may desire to purchase a souvenir or record a portion of the performance on their phone. Accordingly, often at concerts spectators will use their phones to capture portions of the performance as a token of their experience.

However, the phone recording has several disadvantageous for capturing the spectators experience. For example, the phone recording will have a degradation of audio quality as the recording relies on the phones microphone. Additionally, when the user hears a portion of the performance that really resonates with them, the opportunity to record that audio may have passed.

Described herein are methods, systems, and apparatuses for allowing a spectator to capture audio bites of a live event. An audio bite also referred to as an audio clip refers to a clip of speech or music extracted from the live event. For example, the embodiments herein may allow a spectator to capture the last n-seconds of a performer's live audio. In other words, the spectator can grab an audio bite of something that they just heard during the live event and allow the spectator to replay a portion of the live event. Embodiments, may capture audio directly from an audio source (e.g., mix board) to improve the audio quality of the audio bite. Embodiments herein may use a recording device that receives audio from an audio source, stores the audio bite on a circular buffer, and uploads an audio bite to a server when an audience device (e.g., cell phone) requests the audio bite.

However, if all audience members' devices were allowed the ability to simply stream directly from an audio source, a significant amount of uploading and downloading may occur. Often at live events, there may be bandwidth limitations due to many cell phones accessing a communications network in the same area. Accordingly, embodiments herein may use a common recording device and the download and stream to the audience device may occur later. If an entire audio stream for an event were uploaded, it would use a significant amount of bandwidth. By only uploading user requested segments of the audio stream, the bandwidth used may be reduced.

While many of the embodiments discussed herein refer to concerts and music events, the embodiments may also be used for to capture audio bites of speech or other audio event. For example, embodiments may be used to capture a portion of a live podcast, political rally, church, etc recording contemporaneously with the live event.

The phrases "coupled to," "connected to," and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

It will be readily understood that the components of the embodiments as generally described below and illustrated in the Figures herein could be arranged and designed in a wide variety of different configurations. For instance, the steps of a method do not necessarily need to be executed in any specific order, or even sequentially, nor do the steps need to be executed only once. Thus, the following more detailed description of various embodiments, as described below and represented in the Figures, is not intended to limit the scope of the disclosure but is merely representative of various embodiments. While the various aspects of the embodiments are presented in the drawings, the drawings are not necessarily drawn to scale unless specifically indicated.

Embodiments and implementations of systems and methods described herein may include various steps, which may be embodied in machine-executable instructions to be executed by a computer system. A computer system may include one or more general-purpose or special-purpose computers (or other electronic devices). The computer system may include hardware components that include specific logic for performing the steps or may include a combination of hardware, software, and/or firmware.

Embodiments may be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. A suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, mobile computer, server, mainframe, cluster, so-called "network computer" or "thin client," tablet, smart phone, personal digital assistant or other hand-held computing device, "smart" consumer electronics device or appliance, medical device, or a combination thereof.

Each computer system includes one or more processors and/or memory; computer systems may also include various input devices and/or output devices. The processor may include a general-purpose device, such as an Intel®, AMD®, or other "off-the-shelf" microprocessor. The processor may include a special-purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other type of computer-readable storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

Suitable software to assist in implementing the invention is readily provided by those of skill in the pertinent art(s) using the teachings presented here and programming languages and tools, such as Modern Fortran, Java, Pascal, C++, C, PHP, .Net, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Aspects of certain embodiments may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implement particular abstract data types. A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media.

FIG. 1 illustrates a signal flow block diagram of a live audio bite system 100. The live audio bite system 100 may comprise an audience device 102, a server 104, and a recording device 106. The live audio bite system 100 may allow an audience member to capture portions of audio from the audio source 108. For example, an audience member attending a concert may be able to capture a portion of the performance using the live audio bite system 100.

The audience device 102 may be a device that is controllable by an audience member. For example, the audience device 102 may be a personal electronic device (e.g., cell phone, tablet, computer, etc.). The audience device 102 may include one or more processors memory. Instructions stored on the memory may cause the one or more processors to request an audio capture and receive a download or stream of the audio capture. The instructions may be part of an application for the personal electronic device. The request for audio capture may allow the audience device 102 to obtain a contemporaneously recorded portion of audio of the live event captured by the recording device 106.

An audio capture request 110 may be generated from the audience device in response to the audience member seeking to obtain the contemporaneously recorded portion. For example, the application may cause the audience device 102 to display a graphical user interface (GUI) with a set of options. The GUI may have a button that the audience member may select when an audio capture is desired. Selecting this button may cause the audience device 102 to transmit an audio capture request 110. The audio capture request 110 may be sent either upon selection of the button or upon release of the button. For example, in some embodiments, the button may be associated with video recording. Selecting and holding the button may cause the audience device 102 to begin to record video, and when the button is released, the video recording stops and the audio capture request 110 is sent. The audio of the video may later be overwritten by audio captured by the recording device 106. In other embodiments, the user does not hold the button for video recording and the audio capture request 110 may be sent when the audience member selects an option to stop the video recording.

The audio capture request 110 may be used to trigger the recording device 106 to upload a last n-seconds of audio. In some embodiments, the audio capture request 110 may be a ping with a payload that may include a timestamp indicating the time of transmission. In some embodiments, the number of seconds may be pre-defined by the live audio bite system 100, the recording device 106, or the server 104. In other embodiments, the user of the audience device 102 may be able to select how many seconds the audio clip will be. The audio capture request 110 may comprise information that may be used to identify the requested audio capture. For example, in some embodiments, the audio capture request 110 may include a user's location (i.e., location information) and a timestamp. For example, the audience device 102 may determine a global positioning system (GPS) location (e.g., latitude and longitude) of the audience device 102, and the GPS location may be included in the audio capture request 110.

The server 104 may receive the audio capture request 110 via a communication interface 112 through a network connection. The server 104 may transmit a notification 114 to the recording device 106 based on the audio capture request 110. The server 104 may use the audio capture request 110 to determine what portion of the audio (e.g., timing of the requested audio bite) and which recording device 106 is recording the audio. To identify the timing of the audio bite, the server 104 may use the time stamp of the audio capture request 110 or a timestamp of when the audio capture request 110 was received.

The server 104 may identify the recording device 106 that is recording the desired audio based on the GPS location of the audience device 102. In some embodiments, the server determines live events within a target radius. In some embodiments, the target radius may be 500 meters from the GPS location of the audience device 102. In some embodiments, if only one live event is detected, the server 104 may automatically send the notification. In some embodiments, the server may send a response to the audience device 102 with all live events within the target radius. The audience member may then confirm which event the audience member is at. For example, the audience device 102 may present a list of artists and venues and the audience member may click on the artist name and venue name that matches his surroundings.

When the audience device 102 sends a confirmation of the artist and venue, recording data may be posted on the server 104 for the audio capture request 110. The recording data may include an audio identification (ID). The audio ID may be a unique ID for the audio file that will be recorded by the recording device 106. Additionally, the server 104 may update a user profile of the audience member to include this recording to their list of recordings. In some embodiments, the audience device 102 may also send meta-data for the requested audio bite. The meta-data may include a rating, time, place, event, streamer, capturer etc.

The server 104 may send a notification 114 to the recording device 106 after the audio capture request 110 is received. The notification 114 may alert the recording device 106 of the desired audio bite. The notification 114 may include the timestamp of the audio capture request 110 which may be used to select the audio bite to upload 116 to the server 104.

The recording device 106 may be a device that is controllable by a performer. For example, the recording device 106 may be a personal electronic device (e.g., cell phone, tablet, computer, etc.). The recording device 106 may include one or more processors memory. Instructions stored on the memory may cause the one or more processors to record audio from the audio source 108 and upload 116 a requested audio bite.

The recording device 106 may receive a live audio stream from the audio source 108. The audio source 108 may be an electric instrument, mixing board, microphone, etc. The recording device 106 may include a circular buffer to record the last n-seconds of audio. The circular buffer may be constantly flushing out old audio with new audio and maintain a recording of the last n-seconds of audio that was recorded. The recording device 106 may record the audio contemporaneously with the live event.

In some embodiments, when the recording device 106 receives the notification 114, the recording device 106 uploads that n-second audio recorded on the circular buffer to the server 104. The server 104 may include a shared online database to store the audio bite (i.e., audio storage 118 shared between the streamer and the capturer). In some embodiments, the recording device 106 may be subscribed to the server and call a new recording function whenever a new audio capture request 110 is posted to the server 104 where the event ID matches that of the event the recording device 106 is currently hosting.

The new recording function may create a snapshot of the circular buffer that is constantly being updated and flushed out and upload 116 the snapshot to the server 104. In some embodiments, the name of this recording file is the audio ID created when the audio capture request 110 was received. The server 104 may associate the recording data and the recording file with the same audio ID and the audience device 102 may have a copy of the address of where this audio is stored in order for the user to enjoy listening to the recording in the future.

In some embodiments, the server 104 may monitor the audio storage 118 and trigger a cloud audio processing function 120 when the server 104 notices a new audio recording has been uploaded from the recording device 106. The cloud audio processing function 120 may read a compressed file such as MPEG Audio Layer-3 (MP3), OGG, or raw pulse-code modulation (PCM) values of the audio recording and determine an absolute maximum sample loudness of this audio clip. The cloud audio processing function 120 may normalize the audio by adding positive or negative gain to the whole audio signal (e.g., multiplying PCM values by a specific value) in order for that absolute maximum value to hit a target that is the same for other recordings. In some embodiments, audio normalization may be based on root mean square (RMS) or other loudness models such as Loudness Units relative to Full Scale (LUFS). The cloud audio processing function 120 may also add a gain ramp-up to the beginning of the audio recording to create a fade in and add a gain ramp-down to the end of the audio recording in order to create a fade out. The cloud audio processing function 120 may compress the audio recording to another format (e.g., MP3) to reduce the file size. The cloud audio processing function 120 may overwrite the original audio file with a resulting new optimized file. In some embodiments, the cloud audio processing function 120 may also perform audio filtering to remove unwanted frequencies. Further the cloud audio processing function 120 may also add audio tags using machine learning analyses and performing audio information retrieval. The cloud audio processing function 120 may also perform temporal processing such as dynamic range compression and dynamic range expansion.

The audience device 102 may download or stream the audio recording when the user wants to listen back to their recordings. The user may select a song for the audience device to play via the GUI. In some embodiments, the audience device 102 may send a database query for all the recording objects that have the IDs that correspond to the user's list of recordings and display the returned list on the GUI. The user may click on one of those recordings to download the audio file or stream it. The audience device 102 may proceed to play that audio file.

In some embodiments, when the performer is done with their performance the performer simply terminates the event which updates the database to make the event past instead of live and the recording device 106 may stop recording on the circular buffer.

While the illustrated embodiment only shows one audience device and one audio source, the live audio bite system 100 may support a network of devices. The live audio bite system 100 may allow for multiple audience devices to request audio bites from the same recording device and can also allow an audience device to request audio bites from different recording devices. To determine which of the recording devices and audience devices to connect the server may compare the location of both devices (e.g., GPS coordinate).

For example, in some embodiments, a single common recording device may be used by multiple audience devices at a live event. For instance, a first audience member may wish to capture an audio bite a portion of the opening song of a concert. A second audience member may also wish to capture an audio bite, but this second audio bite may be delayed by a few seconds or during a different song. The live audio bite system 100 would receive both of these audio capture requests and cause the recording device 106 to upload the audio stored on the circular buffer at the time associated with each of the audio capture requests.

In some embodiments, the recording device 106 and/or the server 104 may recognize that two audio capture request where sent while the circular buffer has overlapping content (e.g., circular buffer contains fifteen seconds of audio and the audio capture requests were received five seconds apart), and the recording device 106 may only upload the overlapping audio once and the server 104 may splice the audio bite for the second audio capture request with the overlapping audio from the first audio capture request.

While this embodiment shows a single server 104 handling both the audio capture request 110 and the upload 116 from the recording device 106, other embodiments may use multiple devices to accomplish these steps. For example, the audio capture request 110 may be sent through another channel such as SMS, Bluetooth, HTTPS, etc.

Figure 2:
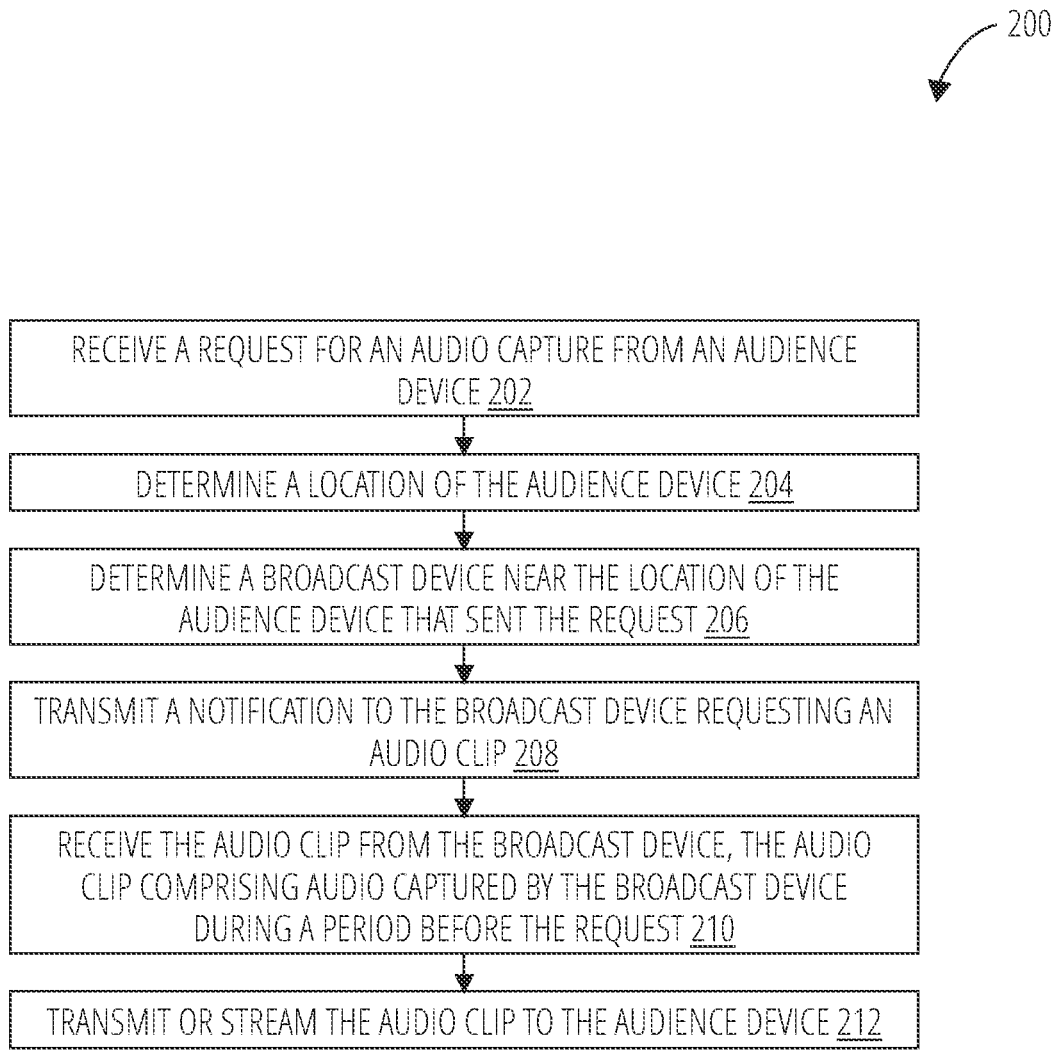
FIG. 2 illustrates a method for capturing an audio bite in accordance with one embodiment.

FIG. 2 illustrates a method 200 that a server, such as the server 104 in FIG. 1, may use for capturing an audio bite. The server may receive 202 a request for an audio capture from an audience device. The server may determine 204 a location of the audience device. For example, the request may include a GPS coordinate of the audience device.

The server may determine 206 a recording device in proximity to the audience device that sent the request. For example, the server may identify one or more recording devices within a target threshold distance from the location of the audience device and transmit 208 to the audience device a description of each event associated with the one or more recording devices within the target threshold distance. The server may receive user input, from the audience device, identifying which event the audio clip should be captured from.

The server may transmit 208 a notification to the recording device requesting an audio clip. In some embodiments, the recording device records audio from an audio source on a circular buffer. The server may receive 210 the audio clip from the recording device. The audio clip may include audio captured by the recording device on the circular buffer during a period before the request. In some embodiments, the server may perform audio processing on the audio clip and overwriting the audio clip with a resulting optimized audio clip. The length of the audio clip is preset to a specific amount of time or, the length of the audio clip is user selectable up to a time limit. The server may transmit or stream 212 the audio clip to the audience device upon request.

Figure 3:
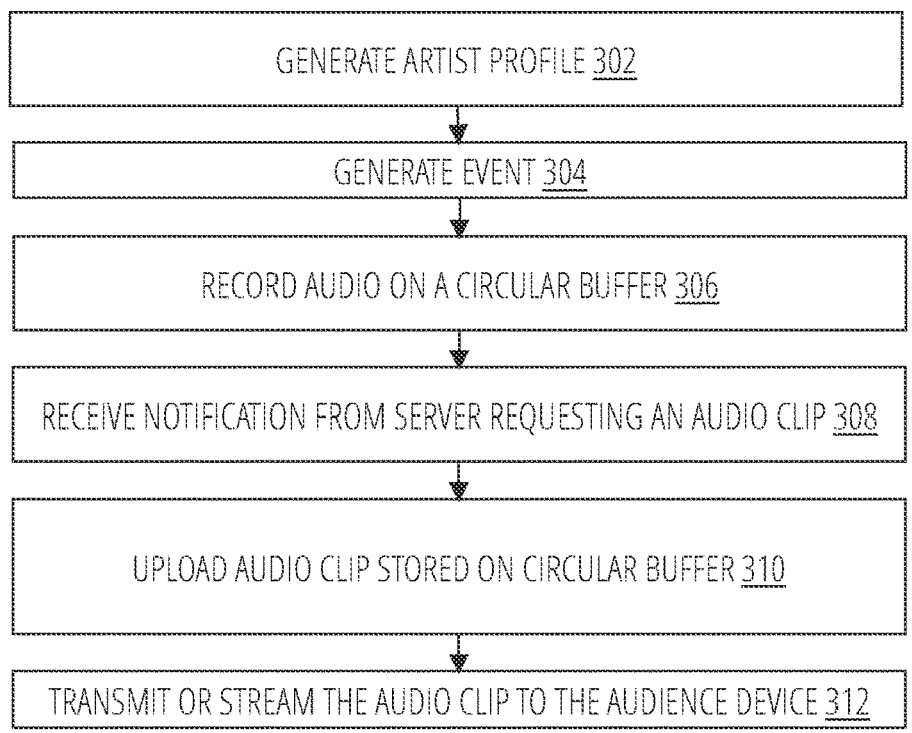
FIG. 3 illustrates a method that a recording device may use for recording a live event in accordance with one embodiment.

FIG. 3 illustrates a method 300 that a recording device, such as the recording device 106 in FIG. 1, may use for recording a live event. The recording device may generate 302 an artist profile. Anyone may create an artist profile via an application. The artist profile creation may include the name of the artist, a biography, a genre of audio, an image, and social media accounts. This information may be stored on the server.

The recording device may generate 304 an event. The event is a performance associated with an artist profile. The recording device may obtain event information to initiate the event and provides the event information to the server. The event information can include the an ID associated with the artist profile, an event ID (e.g., a unique ID for the event), a time stamp of when the event was created, an event type (e.g., concert, podcast, speech, etc.), an event name, a venue name, a city, location of the event, and a genre of audio. In some embodiments, the location of the event may be GPS coordinates (latitude and longitude) found using location services on the recording device and taking the current location of the artist's phone during the event creation. The server may store a repository of all events that are currently on standby, live, or past, as well as the event locations.

Upon creation of the event, the recording device may place the event on standby to allow the artist to get set up before going live. To set up the recording device the artist may set up a means to get analog audio into the recording device. For example, if the artist is playing acoustic instruments he/she could either use their phone's microphone or connect a high quality, third party, microphone to the phone. If the audio is all getting routed through a mixing board or amplifier, the recording device can be coupled to soundcards which route a mono audio line right into the microphone input of the audio I/O of the recording device. In some embodiments, the recording device may be recording or receiving a soundboard recording.

Once the artist is ready the artist may select an option on a GUI of the recording device to go live. To go live, the recording device may push an update to the server to change their event from standby to live and the server may cause the event to be discoverable by listeners (e.g., audience devices). When the event goes live, the recording device may record 306. In some embodiments, the recording device may initialize the circular buffer with silence (i.e., the values of the circular buffer may be set to zero). This circular buffer can be populated by raw audio (PCM) data points to generate an audio clip. In some embodiments, the audio clip could be compressed in real time to mp3 or OGG or equivalent. The recording device may receive 308 a notification from the server requesting the audio clip. The recording device uploads 310 the audio clip stored on the circular buffer.

Figure 4:
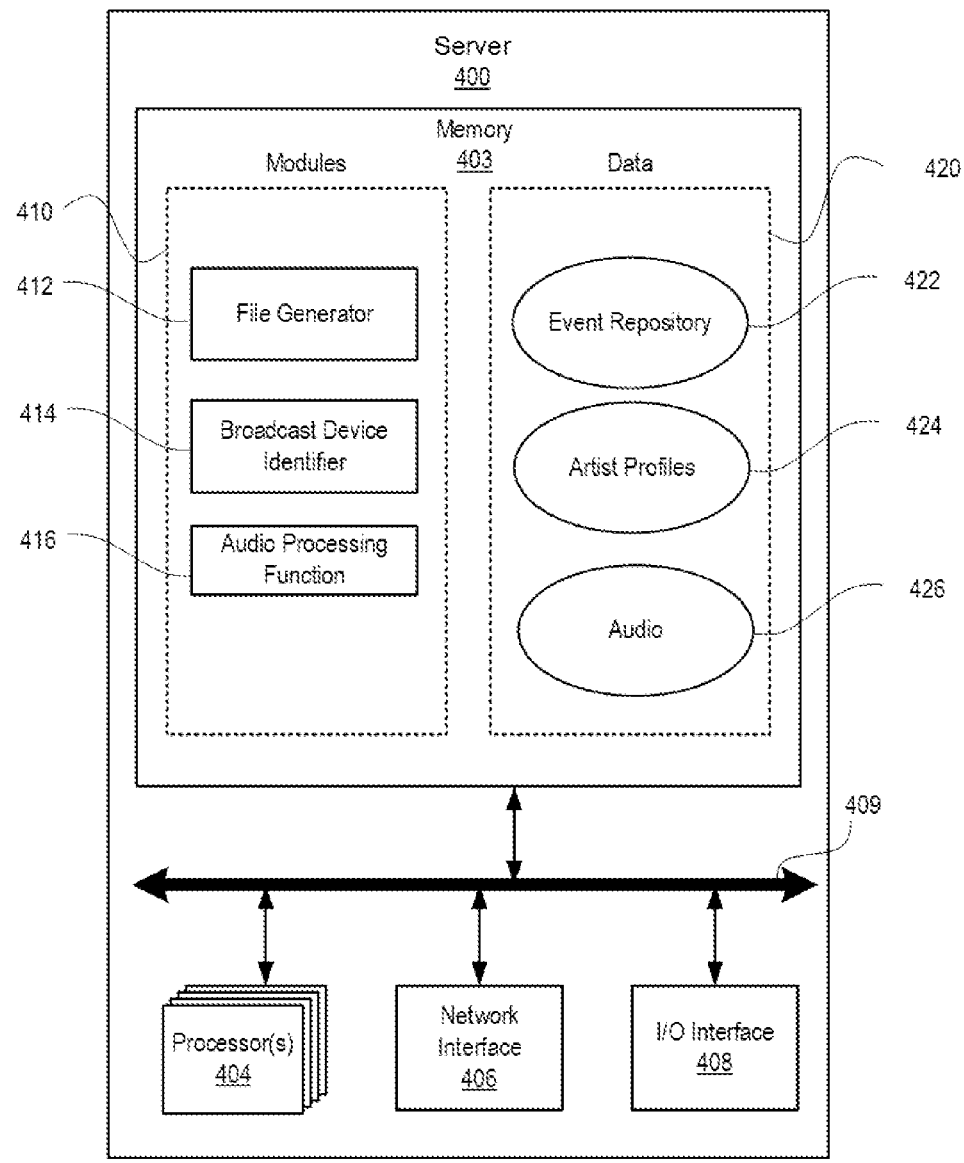
FIG. 4 is a block diagram of a server for a live audio bite system according to one embodiment.
Figure 5:
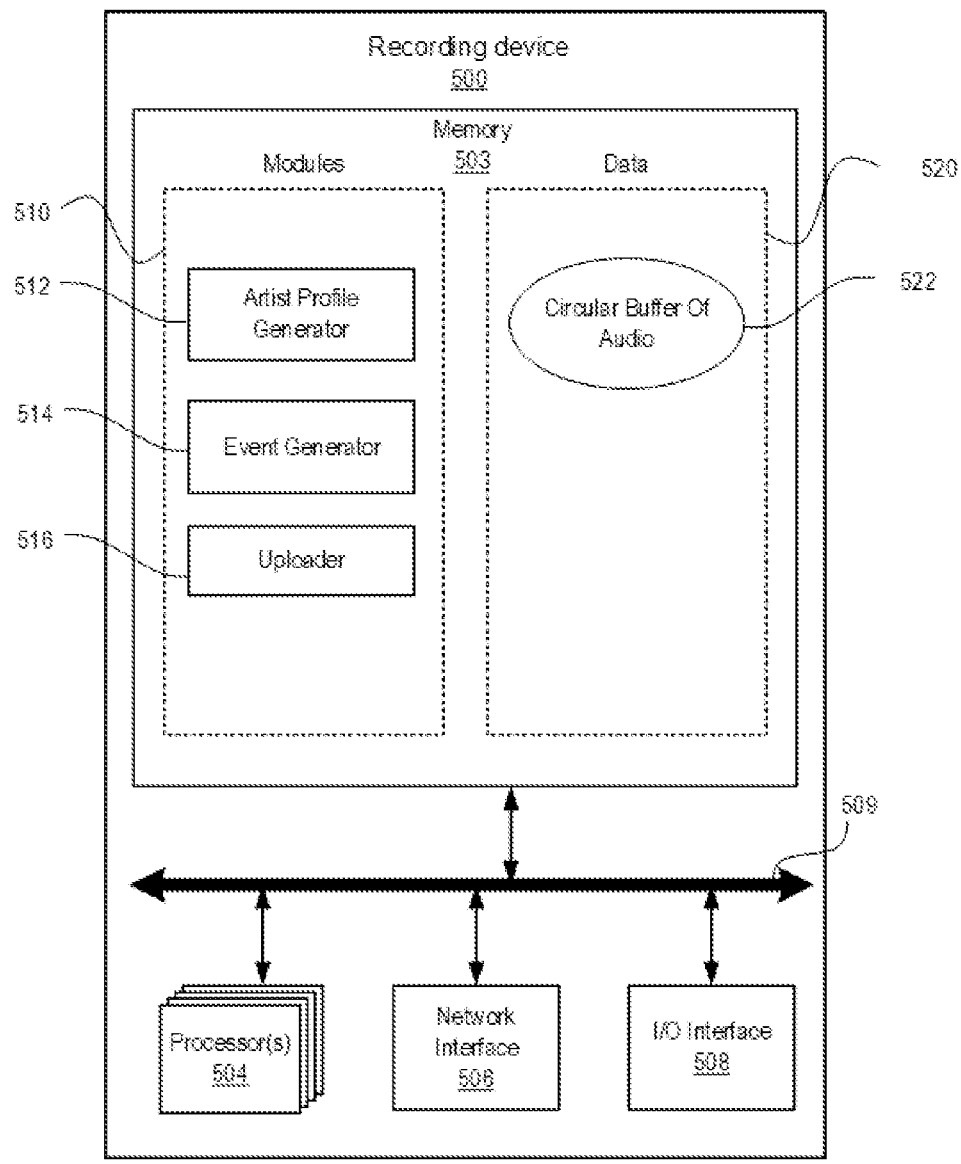
FIG. 5 is a block diagram of a recording device for a live audio bite system according to one embodiment

FIG. 4 is a block diagram of a server 400 for a live audio bite system according to one embodiment. The server 400 may perform the methods and use the techniques described with reference to the other figures in the specification. The server 400 can include a memory 403, one or more processors 404, a network interface 406, an input/output interface 408, and a system bus 409.

The one or more processors 404 may include one or more general purpose devices, such as an Intel®, AMD®, or other standard microprocessor. The one or more processors 404 may include a special purpose processing device, such as ASIC, SoC, SiP, FPGA, PAL, PLA, FPLA, PLD, or other customized or programmable device. The one or more processors 404 can perform distributed (e.g., parallel) processing to execute or otherwise implement functionalities of the presently disclosed embodiments. The one or more processors 404 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 403 may include static RAM, dynamic RAM, flash memory, one or more flip-flops, ROM, CD-ROM, DVD, disk, tape, or magnetic, optical, or other computer storage medium. The memory 403 may include a plurality of program modules 410 and program data 420. The memory 403 may be local to the server 400, as shown, or may be distributed and/or remote relative to the server 400.

Data generated or used by the server 400, such as by the program modules 410 or other modules, may be stored on the memory 403, for example, as stored program data 420. The data 420 may be organized as one or more databases.

The data 420 may include an event repository 422, artist profiles, and recorded audio 422. The event repository 422 may be a collection of information related to events on standby, live, or past such as location, artist, such as recording device ID. The artist profile 424 may be a collection of information related to artists associated with the recording devices. The audio 426 may be audio clips uploaded from the circular buffer of the recording devices.

The program modules 410 may run multiple operations concurrently or in parallel by or on the one or more processors 404. In some embodiments, portions of the disclosed modules, components, and/or facilities are embodied as executable instructions embodied in hardware or firmware, or stored on a non-transitory, machine-readable storage medium. The executable instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems, and/or the like.

The modules 410 may comprise a file generator 412, a recording device identifier 414, an and an audio processing function 416. The file generator 412 may create a file when an audience device requests an audio clip. The recording may be associated with the file for future retrieval by the audience device. The recording device identifier 414 may identify a desired recording device based on the location of the audience device and the event location. The audio processing function 416 may perform audio processing on the audio clip to optimize the clip (e.g., fade in, fade out, loudness leveling, etc.)

The input/output interface 408 may facilitate user interaction with one or more input devices and/or one or more output devices. The input device(s) may include a keyboard, mouse, touchscreen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network interface 406 may facilitate communication with other computing devices (e.g., recording devices and audience devices) and/or networks and/or other computing and/or communications networks. The network interface 406 may be equipped with conventional network connectivity, such as, for example, Ethernet (IEEE 1102.3), Token Ring (IEEE 1102.4), Fiber Distributed Datalink Interface (FDDI), or Asynchronous Transfer Mode (ATM). Further, the network interface 406 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 409 may facilitate communication and/or interaction between the other components of the server 400, including the one or more processors 404, the memory 403, the input/output interface 408, and the network interface 406.

FIG. 4 is a block diagram of a recording device 500 for a live audio bite system according to one embodiment. The recording device 500 may perform the methods and use the techniques described with reference to the other figures in the specification. The recording device 500 can include a memory 503, one or more processors 504, a network interface 506, an input/output interface 508, and a system bus 509.

The one or more processors 504 may include one or more general purpose devices, such as an Intel®, AMD®, or other standard microprocessor. The one or more processors 504 may include a special purpose processing device, such as ASIC, SoC, SiP, FPGA, PAL, PLA, FPLA, PLD, or other customized or programmable device. The one or more processors 504 can perform distributed (e.g., parallel) processing to execute or otherwise implement functionalities of the presently disclosed embodiments. The one or more processors 504 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 503 may include static RAM, dynamic RAM, flash memory, one or more flip-flops, ROM, CD-ROM, DVD, disk, tape, or magnetic, optical, or other computer storage medium. The memory 503 may include a plurality of program modules 510 and program data 520. The memory 503 may be local to the recording device 500, as shown, or may be distributed and/or remote relative to the recording device 500.

Data generated or used by the recording device 500, such as by the program modules 510 or other modules, may be stored on the memory 503, for example, as stored program data 520. The data 520 may be organized as one or more databases.

The data 520 may include a circular buffer of audio 522. The circular buffer may be constantly flushing out old audio with new audio and maintain a recording of the last n-seconds of audio that was recorded.

The program modules 510 may run multiple operations concurrently or in parallel by or on the one or more processors 504. In some embodiments, portions of the disclosed modules, components, and/or facilities are embodied as executable instructions embodied in hardware or firmware, or stored on a non-transitory, machine-readable storage medium. The executable instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems, and/or the like.

The modules 510 may comprise an artist profile generator 512, an event generator 514, and an uploader 516. The artist profile generator 512 may be used to create an artist profile as described with reference to FIG. 3. The event generator 514 may be used to create an event as described with reference to FIG. 3. The uploader 516 may capture a snapshot of the audio in the circular buffer of audio 522 and upload the audio to a server. In some embodiments, the audio may be compressed by the recording device 500 before it is uploaded.

The input/output interface 508 may facilitate user interaction with one or more input devices and/or one or more output devices. The input device(s) may include a keyboard, mouse, touchscreen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network interface 506 may facilitate communication with other computing devices (e.g., recording devices and audience devices) and/or networks and/or other computing and/or communications networks. The network interface 506 may be equipped with conventional network connectivity, such as, for example, Ethernet (IEEE 1102.3), Token Ring (IEEE 1102.4), Fiber Distributed Datalink Interface (FDDI), or Asynchronous Transfer Mode (ATM). Further, the network interface 506 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 509 may facilitate communication and/or interaction between the other components of the server 500, including the one or more processors 504, the memory 503, the input/output interface 508, and the network interface 506.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

While specific embodiments of have been illustrated and described, it is to be understood that the disclosure provided is not limited to the precise configuration and components disclosed. Various modifications, changes, and variations apparent to those of skill in the art having the benefit of this disclosure may be made in the arrangement, operation, and details of the methods and systems disclosed, with the aid of the present disclosure.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill, having the benefit of this disclosure, in the art that changes may be made to the details of the above-described embodiments without departing from the underlying principles of the disclosure herein.

What is claimed is:

1. A method of processing a request for audio captured at a live event, the request being initiated by an audience member while attending the live event and seeking to obtain a contemporaneously recorded portion of the captured audio, the method comprising:
   receiving the request through a network connection with an audience device of the audience member, the request including location information of, and being generated from, the audience device in response to the audience member seeking to obtain the contemporaneously recorded portion;
   determining, based on the location information of the request, a recording device in proximity to the audience device that generated the request;
   causing the recording device to provide an audio clip captured during a period before the request, such that the audio clip acts as the contemporaneously recorded portion of the audio captured at the live event, wherein the audio clip is a segment of audio with a length of n-seconds, wherein n-seconds is less than a length of the live event, and wherein the audio clip is from a buffer on the recording device that is constantly flushing out old audio with new audio to maintain a recording of a last n-seconds of audio of the live event; and
   storing, on an online database, the audio clip present on the buffer when the request is received to preserve the audio clip as the buffer flushes out the audio clip with new audio, thereby creating a snapshot of the buffer as it was when the request was received; and
   transmitting or streaming the audio clip to the audience device at a time after the live event.

2. The method of claim 1, further comprising performing audio processing on the audio clip and overwriting the audio clip with a resulting optimized audio clip.

3. The method of claim 1, wherein the audio clip is audio stored on a circular buffer of the recording device when the notification is received by the recording device.

4. The method of claim 1, wherein determining the recording device comprises:
   identifying one or more recording devices within a target threshold distance from a location of the audience device;
   transmitting, to the audience device, a description of each event associated with the one or more recording devices within the target threshold distance; and
   receiving user input, from the audience device, identifying which event the audio clip should be captured from.

5. The method of claim 1, wherein a length of the audio clip is preset to a specific amount of time.

6. The method of claim 1, wherein a length of the audio clip is user selectable up to a time limit.

7. The method of claim 1, wherein the request is received based on the audience device recording a video,
   wherein the method further comprises overwriting audio associated with the video as captured by the audience device with the audio clip.

8. The method of claim 7, wherein the request is sent when the audience device stops recording the video.

9. The method of claim 1, further comprising:
   receiving a second request;
   recognizing that the second request was sent while the buffer contains overlapping audio with a previous request;
   uploading the overlapping audio once; and
   splicing a second audio clip associated with the second request with the overlapping audio from the previous request.

10. A non-transitory computer-readable storage medium, the computer-readable storage medium including instructions that when executed by a computer, cause the computer to process a request for audio captured at a live event, the request being initiated by an audience member while attending the live event and seeking to obtain a contemporaneously recorded portion of the captured audio, the computer to:

receive the request through a network connection with an audience device of the audience member, the request including location information of, and being generated from, the audience device in response to the audience member seeking to obtain the contemporaneously recorded portion;

determine, based on the location information of the request, a recording device in proximity to the audience device that generated the request; and cause the recording device to provide an audio clip captured during a period before the request, such that the audio clip acts as the contemporaneously recorded portion of the audio captured at the live event, wherein the audio clip is a segment of audio with a length of n-seconds, wherein n-seconds is less than a length of the live event, and wherein the audio clip is from a buffer on the recording device that is constantly flushing out old audio with new audio to maintain a recording of a last n-seconds of audio of the live event; and store, on an online database, the audio clip present on the buffer when the request is received to preserve the audio clip as the buffer flushes out the audio clip with new audio, thereby creating a snapshot of the buffer as it was when the request was received; and transmit or stream the audio clip to the audience device at a time after the live event.

11. The computer-readable storage medium of claim 10, wherein the instructions further configure the computer to perform audio processing on the audio clip and overwriting the audio clip with a resulting optimized audio clip.

12. The computer-readable storage medium of claim 10, wherein the audio clip is audio stored on a circular buffer of the recording device when the notification is received by the recording device.

13. The computer-readable storage medium of claim 10, wherein to determine the recording device, the instructions further configure the computer to:

identify one or more recording devices within a target threshold distance from a location of the audience device;

transmit, to the audience device, a description of each event associated with the one or more recording devices within the target threshold distance; and receive user input, from the audience device, identifying which event the audio clip should be captured from.

14. The computer-readable storage medium of claim 10, wherein a length of the audio clip is preset to a specific amount of time.

15. The computer-readable storage medium of claim 10, wherein a length of the audio clip is user selectable up to a time limit.

16. A system for processing a request for audio captured at a live event, the request being initiated by an audience member while attending the live event and seeking to obtain a contemporaneously recorded portion of the captured audio, the system comprising:

a processor; and a memory storing instructions that, when executed by the processor, configure the apparatus to:

receive the request through a network connection with an audience device of the audience member, the request including location information of, and being generated from, the audience device in response to the audience member seeking to obtain the contemporaneously recorded portion;

determine, based on the location information of the request, a recording device in proximity to the audience device that generated the request; and cause the recording device to provide an audio clip captured during a period before the request, such that the audio clip acts as the contemporaneously recorded portion of the audio captured at the live event, wherein the audio clip is a segment of audio with a length of n-seconds, wherein n-seconds is less than a length of the live event, and wherein the audio clip is from a buffer on the recording device that is constantly flushing out old audio with new audio to maintain a recording of a last n-seconds of audio of the live event; and store, on an online database, the audio clip present on the buffer when the request is received to preserve the audio clip as the buffer flushes out the audio clip with new audio, thereby creating a snapshot of the buffer as it was when the request was received; and transmit or stream the audio clip to the audience device at a time after the live event.

17. The system of claim 16, wherein the instructions further configure the system to perform audio processing on the audio clip and overwriting the audio clip with a resulting optimized audio clip.

18. The system of claim 16, wherein the audio clip is audio stored on a circular buffer of the recording device when the notification is received by the recording device.

19. The system of claim 16, wherein to determine the recording device, the instructions further configure the system to:

identify one or more recording devices within a target threshold distance from a location of the audience device;

transmit, to the audience device, a description of each event associated with the one or more recording devices within the target threshold distance; and receive user input, from the audience device, identifying which event the audio clip should be captured from.

20. The system of claim 16, wherein a length of the audio clip is preset to a specific amount of time.

\* \* \* \* \*